July 21, 1964  L. W. JACOBS  3,141,997
ELECTRIC PANEL ASSEMBLY
Filed March 19, 1962  2 Sheets-Sheet 1

INVENTOR.
LEWIS W. JACOBS
BY Robert F. Casey
ATTORNEY

INVENTOR.
Lewis W. Jacobs
BY Robert A. Casey
ATTORNEY

United States Patent Office 3,141,997
Patented July 21, 1964

3,141,997
ELECTRIC PANEL ASSEMBLY
Lewis W. Jacobs, West Hartford, Conn., assignor to General Electric Company, a corporation of New York
Filed Mar. 19, 1962, Ser. No. 180,540
4 Claims. (Cl. 317—99)

The present invention relates to electric panel assemblies, and particularly to panel assemblies of the type utilized in the control of lighting and power circuits of medium and low ampere capacity such as in residential electric service entrance equipment.

Until recent years, the ampere capacity of such assemblies used in most residential applications has been 100 amperes or less. With the greater use of electric power in the home, however, an increasing need has become evident for such panel assemblies or "load centers" having capacities of from 100 to 200 ampers. Such increased capacity requirements have presented problems in connection with the use of prior assemblies designed for such use, in two main categories: (1) the current-carrying capacity of standard bus bars is insufficient for such higher rated assemblies, requiring the use of special bus bars, and (2) the requirements of main or incoming power connection and control devices are such that devices used in lower capacity load centers have heretofore been unusable in such higher capacity assemblies.

It is an object of the present invention to provide an electric panel assembly of high total capacity such as 200 amperes, utilizing connection and control components formerly usable to provide panel assemblies of relatively low capacity such as 100 amperes.

It is another object of the invention to provide a panel assembly of the type described having a high capacity such as 200 amperes and utilizing a main control device comprising a plurality of relatively low capacity circuit breakers such as 100 amperes disposed and arranged for use as a single high capacity circuit breaker.

In accordance with the invention a panel assembly is provided comprising a pair of panel sub-assemblies of relatively low capacity in juxtaposed relation. Each such panel sub-assembly includes at least two bus bars having means for connecting a plurality of branch utilization power control devices. Each panel sub-assembly has a pair of power input devices connected thereto, one to each bus bar. Means is also provided for connecting a pair of high capacity incoming power conductors in such a manner that each such incoming conductor is connected to one bus bar of each panel sub-assembly.

In accordance with the invention in one form a pair of panel sub-assemblies are provided each sub-assembly having a pair of bus bars having a plurality of plug-in type contacts for receiving plug-in type circuit breakers. The sub-assemblies are disposed in juxtaposed relation and a pair of two-pole circuit breakers are mounted, one on each sub-assembly so that each pole of each breaker is connected to one bus bar. The circuit breakers are disposed in adjacent relation and the handles thereof are tied together for operation as a single unit.

The invention will be more fully understood from the following detailed description, and its scope will be pointed out in the appended claims.

Figure 1:
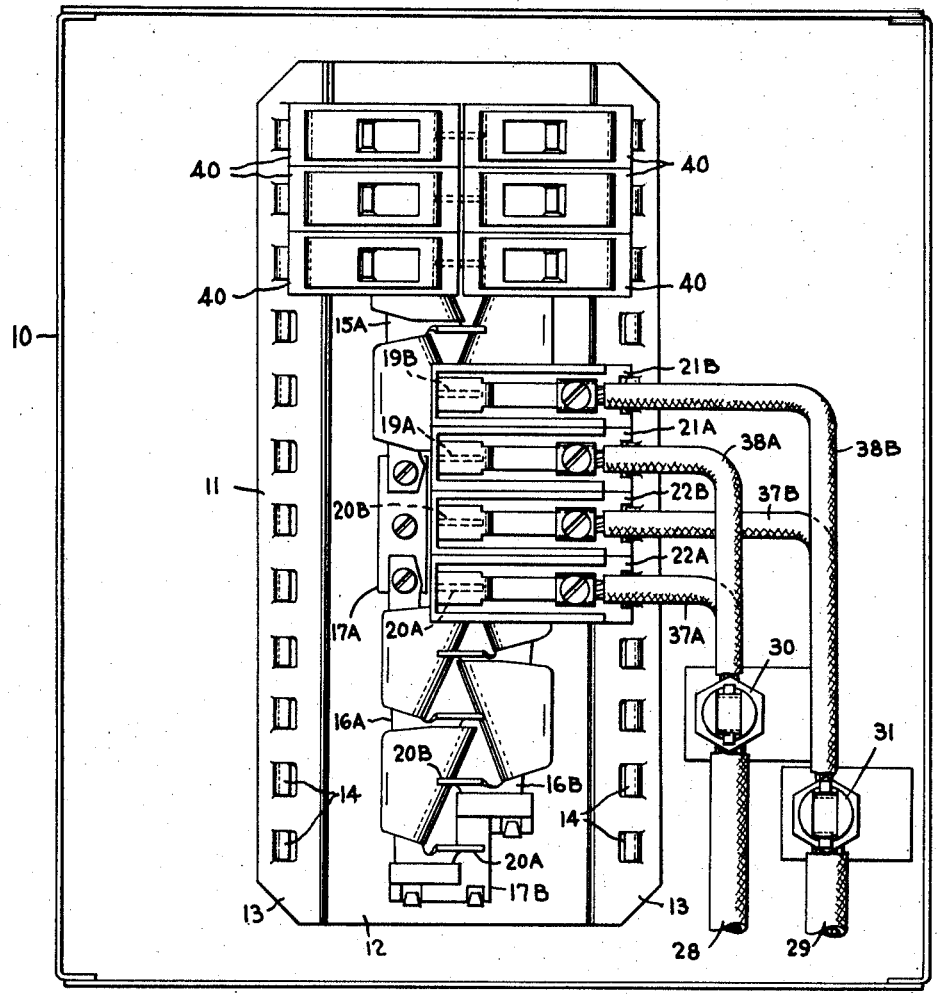
FIGURE 1 is a top plan view of a panel assembly incorporating the present invention.

The invention is shown in FIGURE 1 as incorporated in a panel assembly or load center including a main enclosure or box 10 having a supporting pan 11 mounted therein by suitable means, not shown. The pan 11 has a generally planar back wall 12 and two outwardly-directed flanges 13 having circuit breaker retaining means comprising hooks 14 struck upwardly therefrom.

Two pairs of bus bars 15A, 15B and 16A, 16B are supported on the back wall 12 by suitable insulating means such as insulating blocks 17A, 17B.

Each of the bus bars 15A, 15B and 16A, 16B has a series of upstanding plug-in type contacts comprising blades 19A, 19B, and 20A, 20B, respectively.

The bus bars 15A, 15B, together with their contact blades 19A, 19B, comprise a first panel sub-assembly. The bus bars 16A, 16B together with their contact blades 20A, 20B comprise a second panel sub-assembly.

A plurality of plug-in type connectors 21A, 21B, and 22A, 22B, are utilized for delivering power to the bus bars 15A, 15B and 16A, 16B, respectively.

Figure 2:
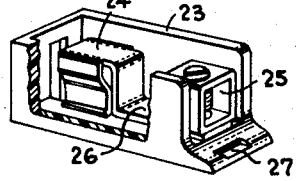
FIGURE 2 is a perspective view of a connector block utilized in the panel assembly of FIGURE 1.

As shown in FIGURE 2, each connector 21A, 21B, 22A, 22B, comprises an insulating body 23, having a plug-in type connector 24 and a conductor clamp or lug 25 mounted therein, and connected by a conductor 26. The body 23 also has a shelf or lug portion 27 adapted to be engaged under one of the hooks 14. The body 23 is retained in place by the aforesaid engagement of the lug portion 27 and hook 15 at one end and by frictional engagement of the connector 24 with a contact blade of one of the bus bars 15A, 15B, 16A, 16B.

The connector block described above and shown in FIGURES 1 and 2 is the invention of Joseph F. Johnson, which invention was made prior to my present invention and is shown and claimed in application Serial Number 181,935, filed March 23, 1962, and assigned to the same assignee as the present invention. This disclaimer refers only to the connector block shown, and not to any circuit arrangements shown in the aforesaid application.

The panel sub-assemblies are disposed in juxtaposed relation, whereby the terminals or lugs 25 of the connectors 21A, 21B, 22A, 22B, are disposed in side-by-side alignment.

Figure 3:
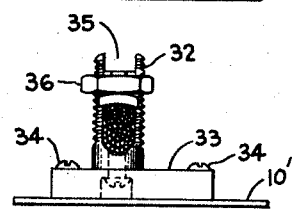
FIGURE 3 is an elevation view of a connector assembly utilized in the panel assembly of the invention.

For the purpose of delivering power to the bus bars 15A, 15B, 16A, 16B, from a pair of relatively large incoming power conductors 28, 29, a pair of main power connectors 30, 31 are provided. The connectors 30, 31 may be of any suitable type, the connectors shown each comprising (see FIGURE 3) a generally U-shaped conductive member 32 mounted on an insulating base 33 fixed to the back wall 10' of the box 10 by suitable means such as screws 34. The member 32 has a central channel 35 adapted to receive the conductors to be connected, and a clamping nut 36.

The connector 30 serves to connect the incoming conductor 28 to connectors 21A and 22A by means of conductors 37A, 38A. The connector 31 serves to connect the incoming conductor 29 to connectors 21B, 22B, by means of conductors 37B, 38B.

A plurality of branch circuit controlling devices, such as circuit breakers 40 are adapted to be received in conductive relation to the bus bars 15A, 15B, 16A, 16B by having an end portion thereof in engagement with hooks 14 of the pan 11 at one end, and having a plug-in type connector, not shown, in frictional engagement with the blades 19A, 19B, 20A, 20B.

Figure 4:
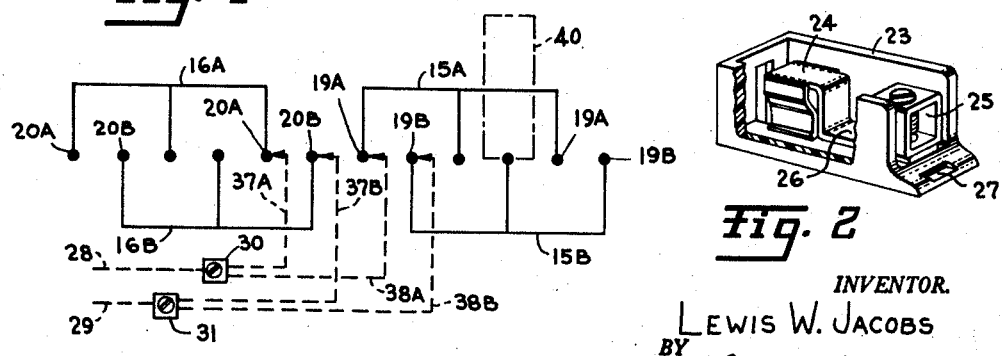
FIGURE 4 is a schematic diagram of the connections of the panel assembly of FIGURE 1.

The schematic diagram of the panel assembly of FIGURE 1 is shown in FIGURE 4.

It will be observed from FIGURE 4 that each of the connectors 37A, 37B, 38A, 38B, is required to carry only one-half of the total capacity of the corresponding main conductors 28, 29, respectively. Similarly, the connectors 21A, 21B, 22A, 22B are also required to connect only such smaller amount of current.

Figure 5:
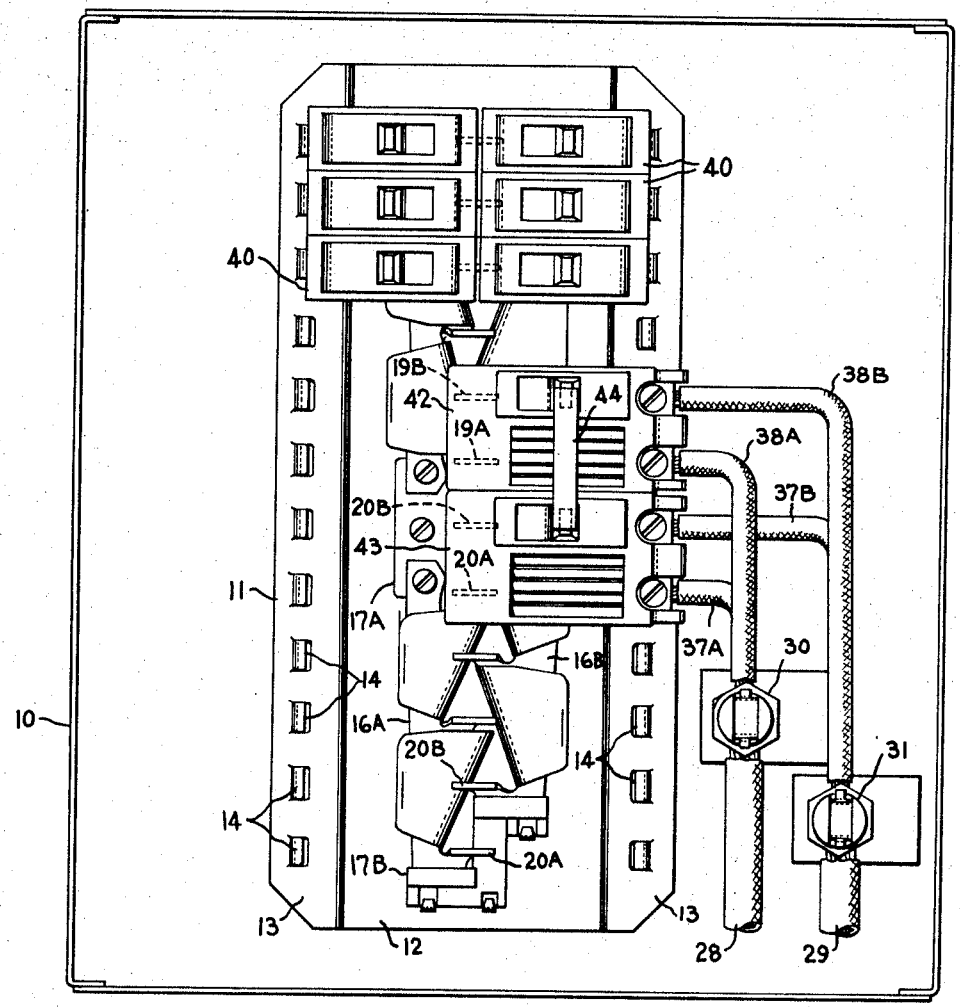
FIGURE 5 is a top plan view of a second panel assembly incorporating the invention and utilizing circuit breakers as incoming power control means.

Another embodiment of the invention is shown in FIGURE 5. In this form, the invention is shown as incorporated in a panel assembly generally similar to that shown in FIGURE 1, but utilizing electric circuit breaker means for the control of the main power input.

Accordingly, the panel assembly of FIGURE 5 comprises an enclosure 10 containing a supporting pan 11 having a back wall 12 and outwardly directed flanges 13 having hooks 14 for retaining electric circuit control devices. Two pairs of electric power bus bars 15A, 15B and 16A, 16B are supported on the back wall 12 of the panel 11 by insulating blocks 17A, 17B, and have upstanding blade portions 19A, 19B, 20A, 20B.

Power is brought in to the panel assembly by means of two relatively large conductors 28, 29 to the connectors 30, 31, each of which feeds two lower capacity conductors 37A, 38A, and 37B, 38B, respectively.

For the purpose of providing manual switching control and overload protection to the incoming power, circuit breaker means is provided comprising two separate two-pole circuit breakers 42, 43. The two-pole circuit breaker 42 has one pole thereof in plug-in electrical engagement with a blade terminal 19A and the other pole in plug-in electrical engagement with a blade terminal 19B. It will be understood that the circuit breakers 42, 43 are of conventional two-pole construction, having a pair of input terminals, not shown, at one end, there being a pair of separable contacts within the circuit breaker casing between each of the input and output terminals respectively, and a single manually movable handle for simultaneously moving the contacts between open and closed position whereby the electrical continuity between two electrically separate circuits may be simultaneously controlled.

The circuit breaker 43 has one pole thereof in plug-in electrical engagement with a blade contact 20A and the other pole in plug-in electrical contact with a contact blade 20B.

For the purpose of permitting simultaneous manual operation of the circuit breakers 42, 43, a handle-tie means 44 is provided, comprising a rigid connector rigidly fixed to each of the handles of the circuit breakers 42, 43 by any suitable means, not shown. The circuit breaker assembly comprising a circuit breaker 42, 43 with the handle tie 44 therefore constitutes essentially a single four-pole circuit breaker having a total capacity of four times the capacity of any one particular pole. Thus if each of the circuit breakers 42, 43 has a nominal ampere rating of 100 amperes, it is possible with the combination shown to provide controlled power to branch circuit utilization devices using a total of 400 amperes at phase-to-ground voltage, or 200 amperes at phase-to-phase voltage. A circuit breaker panel assembly is therefore provided having a total phase-to-phase capacity of 200 amperes, utilizing only circuit breakers having a maximum phase-to-phase capacity of 100 amperes.

The arrangement in accordance with the invention is to be distinguished from a simple paralleling of circuit breakers. Thus, for example, it will be noted that each of the bus bars 15A, 15B and 16A, 16B draws its total power through only *one* pole of *one* circuit breaker, and that no other bus bar draws its power through the same pole. Since each of the bus bars draws its power through only one pole of one circuit breaker, there is no problem as to division of current within the circuit breaker such as could affect the calibration of the circuit breaker. Thus, for example, if one of the bus bars having a total capacity of 100 amperes were to be connected to draw its power through two poles of a two-pole circuit breaker in parallel, each pole would have to have a maximum rating of 50 amperes in order to adequately protect the branch circuits from overloading, and it would moreover be necessary that the hundred amperes drawn by the bus bar be drawn equally 50 amperes each from each of the poles of the two-pole circuit breaker, or else unnecessarily or "nuisance" tripping would occur.

Figure 6:
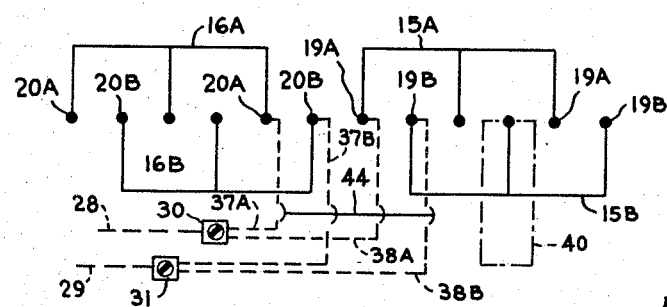
FIGURE 6 is a schematic diagram of the panel assembly of FIGURE 5.

It will likewise be observed that in each of the opposed pairs of bus bars 15A, 15B and 16A, 16B, the members of the pair are of different polarity. In other words, bus bar 15A draws its power from main supply conductor 28, while bus bar 15B draws its power from the main conductor 29. Likewise the bus bar 16A draws its power from the main conductor 28 while the opposed bus bar 16B draws its power from the main conductor 29. This is important, since it assures that adjacent blade type connectors 19A, 19B and 20A, 20B are of different polarity. This is necessary in order to permit the use of conventional two-pole power take-off devices. This division of current can readily be seen from the schematic diagram of FIGURE 6 showing the electrical connections of the panel assembly shown in FIGURE 5.

While the panel assembly of FIGURE 5 utilizes two separate circuit breakers 42, 43, the circuit breakers are disposed in adjacent side-by-side relation and arranged for simultaneous operation by the handle-tie 44. This arrangement therefore affords a single manually accessible handle which can be utilized to shut off all power to the panel assembly. This facility is recognized as a desirable safety feature by electrical code requirements in many areas.

While the panel sub-assemblies have been shown in FIGURES 1 and 5 as in end-to-end alignment, it will be readily apparent that such panel assemblies may if desired be disposed in side-by-side alignment with their corresponding ends in side-by-side relation rather than in end-to-end relation in certain cases.

While only two forms of the invention have been shown, it will be readily appreciated that many modifications thereof may be made, and it is therefore intended by the appended claims to cover all such modifications as fall within the true spirit and scope of the invention.

What I claim as new and desire to secure by Letters Patent of the United States is:

1. An electric panel assembly comprising:
   (a) a support,
   (b) a first pair of electric power bus bars mounted in insulated relation on said support, each of said first bus bars having a plug-in type power input terminal portion and a plurality of plug-in type power output terminal portions,
   (c) a second pair of electric power bus bars mounted in insulated relation on said support, each of said second bus bars having a plug-in type input terminal portion and a plurality of plug-in type power output terminal portions,
   (d) said plug-in type power output terminal portions of each of said pairs of bus bars being disposed in aligned interleaved relation with each other,
   (e) a plug-in type power connector on each of said plug-in type power input terminal portions,
   (f) first and second main power connectors,
   (g) means connecting said first main power connector to a plug-in type power connector of one bus bar of each of said first and second pairs of bus bars,
   (h) means connecting said second main connector to a plug-in type power connector of each of the other bus bars of each of said first and second pairs, and
   (i) said power input terminal portions also being disposed in aligned interleaved relation with each other.

2. An electric panel assembly comprising:
   (a) a support,
   (b) a first pair of electric power bus bars mounted in insulated relation on said support, each of said first bus bars having an input terminal portion and at least one output terminal portion, (c) a second pair of electric power bus bars mounted in insulated relation on said support, each of said second bus bars having an input terminal portion and at least one output terminal portion, (d) a first two-pole circuit breaker having one pole thereof electrically connected to said power input terminal portion of one bus bar of said first pair and having the other pole thereof electrically connected to the other bus bar of said first pair, (e) a second two-pole circuit breaker having one pole thereof electrically connected to said one bus bar of said second pair and having the other pole thereof electrically connected to the other bus bar of said second pair, (f) first and second main power connectors, (g) means connecting said first main power connector to one pole of each of said first and second two-pole circuit breakers, (h) means connecting said second main power connector to the other pole of each of said first and second two-pole circuit breakers, and (i) means connecting said operating handles of said first and second two-pole circuit breakers together for simultaneous operation.

3. An electric panel assembly comprising:

(a) a support, (b) a first pair of electric power bus bars mounted in insulated relation on said support, each of said first bus bars having a plug-in type or input terminal portion and a plurality of plug-in type power output terminal portions, (c) a second pair of electric power bus bars mounted in insulated relation on said support, each of said second bus bars having a plug-in type power input terminal portion and a plurality of plug-in type power output terminal portions, (d) a first plug-in type two-pole circuit breaker having the poles thereof in plug-in type electrical engagement with said plug-in type power input terminal portions of the bus bars of said first pair respectively, (e) a second plug-in type two-pole circuit breaker having the poles thereof in plug-in type electrical engagement with the said plug-in type power input terminal portions of each bus bar of said second pair respectively, (f) first and second main power connectors, (g) means connecting said first main power connector to one pole of each of said first and second plug-in type two-pole circuit breakers, (h) means connecting said second main power connector to the other pole of each of said first and second plug-in type two-pole circuit breakers, and (i) means connecting said manually operable handles of said circuit breakers together for simultaneous operation.

4. An electric panel assembly as set forth in claim 3 wherein all of said plug-in type power terminal portions are in equally spaced alignment with each other.

References Cited in the file of this patent
UNITED STATES PATENTS

| | | |
|---|---|---|
| 2,786,162 | Ballou | Mar. 19, 1957 |
| 3,075,039 | Kobryner | Jan. 22, 1963 |